(12) United States Patent
Kesani et al.

(10) Patent No.: US 10,940,737 B2
(45) Date of Patent: Mar. 9, 2021

(54) TRUCK WITH HEAT TRANSFER SYSTEM

(71) Applicant: Caterpillar Inc., Deerfield, IL (US)

(72) Inventors: Sharath Kesani, Tucson, AZ (US);
Vaitheeswaran Ponnuchamy, Chennai (IN)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/018,608

(22) Filed: Jun. 26, 2018

(65) Prior Publication Data

US 2019/0389272 A1   Dec. 26, 2019

(51) Int. Cl.
*B60P 1/28* (2006.01)
*B60H 1/00* (2006.01)

(52) U.S. Cl.
CPC ............ *B60H 1/00014* (2013.01); *B60P 1/28* (2013.01)

(58) Field of Classification Search
CPC .... B60P 1/28; B60H 1/00014; B60H 1/00021
USPC ............ 298/1 H, 1 V, 17 R, 22 R; 296/183.2
See application file for complete search history.

(56) References Cited

U.S. PATENT DOCUMENTS

| | | | |
|---|---|---|---|
| 3,331,433 A * | 7/1967 | Hagberg | B60H 1/00014 |
| | | | 298/1 H |
| 3,499,678 A | 3/1970 | Richler | |
| 4,826,233 A | 5/1989 | Hagenbuch | |
| 8,690,259 B2 | 4/2014 | Hagenbuch | |
| 8,882,178 B2 | 11/2014 | Kitaguchi et al. | |
| 9,434,231 B2 | 9/2016 | Hagenbuch | |
| 2007/0057564 A1 | 3/2007 | Colling | |
| 2009/0152934 A1 | 6/2009 | Devries et al. | |
| 2012/0169109 A1 | 7/2012 | Rivera et al. | |
| 2015/0001910 A1 * | 1/2015 | Natarajan | B60P 1/286 |
| | | | 298/1 H |

FOREIGN PATENT DOCUMENTS

| | | |
|---|---|---|
| JP | 2012201227 | 10/2012 |
| JP | 2012201227 A | 10/2012 |
| JP | 2013086635 | 5/2013 |
| JP | 2013086635 A | 5/2013 |

* cited by examiner

*Primary Examiner* — Stephen T Gordon
(74) *Attorney, Agent, or Firm* — Schwegman, Lundberg & Woessner

(57) ABSTRACT

A vehicle that includes a frame and a truck body coupled to the chassis. The truck body includes a body floor, first sidewall, second sidewall, front wall, and body rear, or tail surrounding an interior. A heat transfer system is removably coupled to the truck body and includes a component extending along and secured to one of the body floor, first sidewall, second sidewall, front wall, or body rear, or tail to transfer heat to an interior surface of the truck body.

16 Claims, 6 Drawing Sheets

TRUCK WITH HEAT TRANSFER SYSTEM

TECHNICAL FIELD

The present disclosure is direct to an industrial truck. More particularly, to a heat transfer system for reducing material carryback.

BACKGROUND

Industrial trucks are utilized for hauling materials to and from worksites. An example industrial truck is a dump truck utilized at a mining operation that receives mined material for transfer to a different location at the worksite, or a remote location. Such materials can include rock, dirt, minerals, coal, and the like. This material is packed into the bed of the truck for hauling.

After the industrial truck reaches a desired location the truck bed that is moveably attached to the truck frame is typically pivoted about an axis to allow the material to be dumped or transferred from the bed to a desired location. Often additional equipment is utilized to remove the material from the bed.

Inefficiencies occur with these industrial trucks because certain locations within the bed of the truck are prone to carryback. Carryback is when materials within the truck bed stick to the truck bed during unloading or removal and consequently are not removed from the bed as desired. The material then remains in the bed and is carried back to the worksite. Carryback can occur as a result of moisture, freezing, material properties, or the like.

Carryback causes inefficiencies during the mining process. Not only does carryback increase load on the truck when returning to a worksite, reducing gas mileage efficiency, in addition, the amount of material that is able to be loaded into the truck bed is reduced by the carryback already within the bed prior to loading.

One example of a truck body system used to prevent material from sticking to the truck body is provided in US Pat. Pub. No. 20090152934 to Devries et al. Exhaust fumes are routed into the walls of the truck body to heat the truck body. Such systems are complex and not adaptable to existing truck bodies.

The present disclosure is directed to overcoming one or more of the problems set forth above and/or other problems with existing technology.

SUMMARY OF THE INVENTION

In one aspect of the invention a vehicle is provided that includes a frame and a truck body that is coupled to the chassis. The truck body has an interior for receiving materials that is surrounded by a body floor, first sidewall, second sidewall, front wall, and a body rear, or tail. A heat transfer system is removably coupled to the truck body. The heat transfer system includes a component that extends along and is secured to one of the body floor, first sidewall, second sidewall, front wall, or body rear, or tail to transfer heat to an interior surface of the truck body.

In another aspect of the invention a vehicle is provided that includes a frame and a truck body that is coupled to the chassis. The truck body has an interior for receiving materials that is surrounded by a body floor, first sidewall, second sidewall, front wall, and a body rear/tail. A heat transfer system is coupled to the truck body. The heat transfer system includes a first attachment coupled between the first sidewall and the body floor to transfer heat to a transition between the first sidewall and the body floor and a second attachment coupled between the second sidewall and the body floor to transfer heat to a transition between the second sidewall and the body floor.

In yet another aspect of the invention a heating system for transferring heat to an interior of a truck body is provided. The heating system includes a first attachment extending arcuately from a first end to a second end such that an opening is presented between the first and second end. The heating system also includes a second attachment coupled to the first attachment and extending arcuately from the first end to a second end such that an opening is presented between the first and second end. The heating system also includes a third attachment coupled to the second attachment coupled and extending arcuately from a first end to a second end such that an opening is presented between the first and second end.

DETAILED DESCRIPTION

Figure 1:
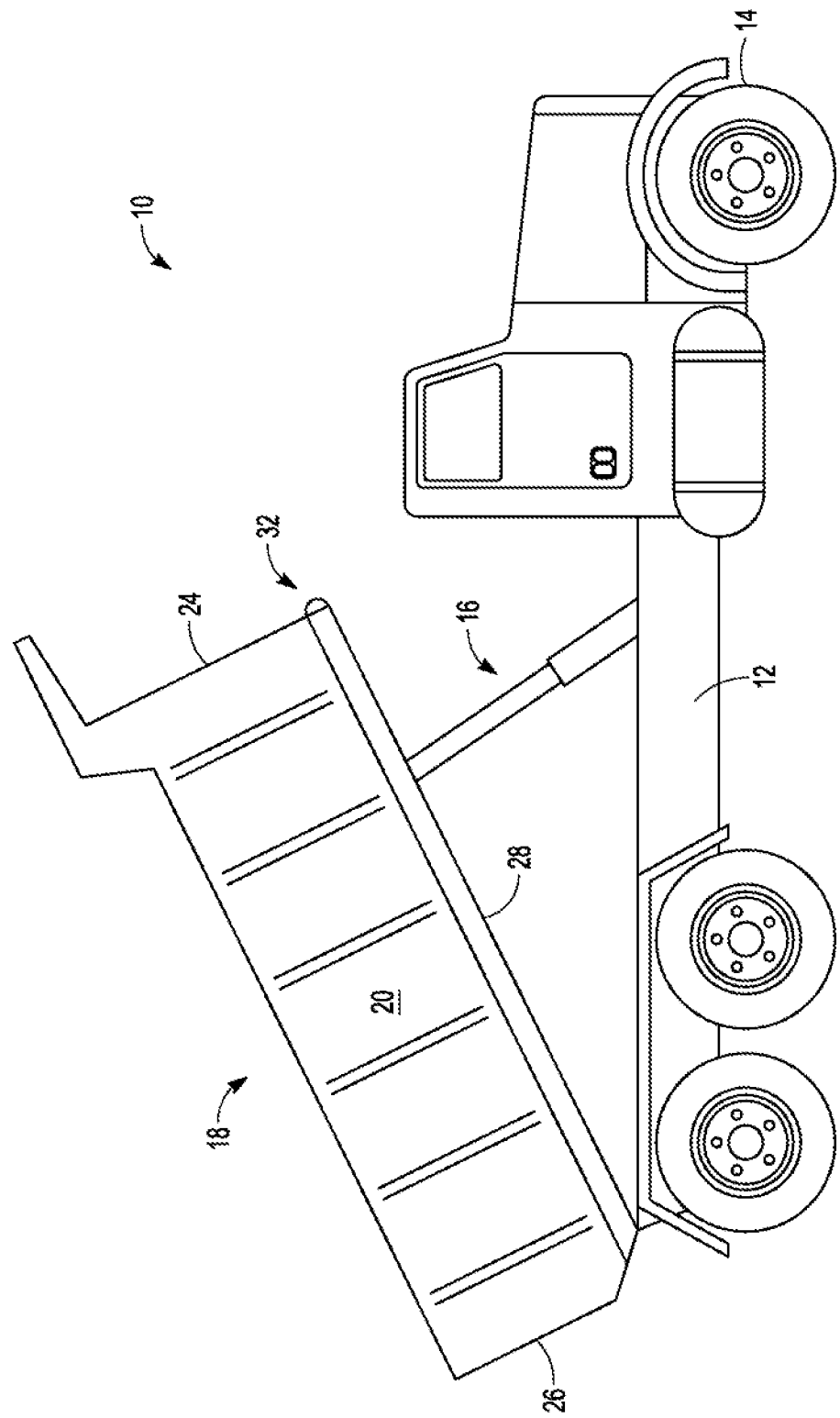
FIG. 1 shows a diagrammatic illustration of an exemplary industrial truck.

FIG. 1 illustrates a vehicle 10 such as an industrial truck used to haul materials. Such materials include soil, rock, debris, minerals, coal, and the like. In one example the industrial truck is a dump truck. The vehicle 10 includes a frame or chassis 12, wheels 14, lift system 16, and truck body 18. Specifically, the truck body 18 is moveably coupled to the frame 12 and moved from a load to unload position via the lift system 16.

The truck body 18 includes a first side wall 20, second side wall (not shown), front wall 24, body rear, or tail 26, and body floor 28 that surround an interior that receives material loads for hauling. Each wall 18, 20, 22, 24, 26, 28 can include structural support such as support ribs to accommodate loads being hauled. The underside of the body floor 28 also includes structure for pivotable attachment to the lift system 16.

A heat transfer system 32 is coupled to the truck body 18 to transfer heat to desired locations of the truck body 18. Specifically, in one example the heat transfer system 32 receives exhaust from the exhaust system, either through conduit routing to the heat transfer system 32, close proximity of the exhaust outlet to the heat transfer system, or an opening in the heat transfer system 32 in close proximity to the exhaust outlet. In other examples the heat provided by the heat transfer system comes from the sun or outside environment. In one example the heat transfer system 32 can be removably attached to the truck body 18, such that the heat transfer system 32 can be retrofitted onto an existing truck body 18. In another example the heat transfer system 32 is permanently secured to the truck body 18 through mold forming, welding, or the like.

FIGS. 2-6 each illustrate example heat transfer systems according to some aspects of the invention. Only the truck body and accompanying heat transfer system is illustrated in each example. In each example, heat may be conveyed into the heat transfer system in any manner, including from the environment, from the exhaust system of the vehicle, or the like. Thus, while not illustrated in the examples of FIGS. 2-6 additional opening(s) may be placed in any of the heat transfer systems for receiving exhaust from the exhaust system of the vehicle, including through a conduit routing system from the exhaust outlet to the heat transfer system.

Figure 2:
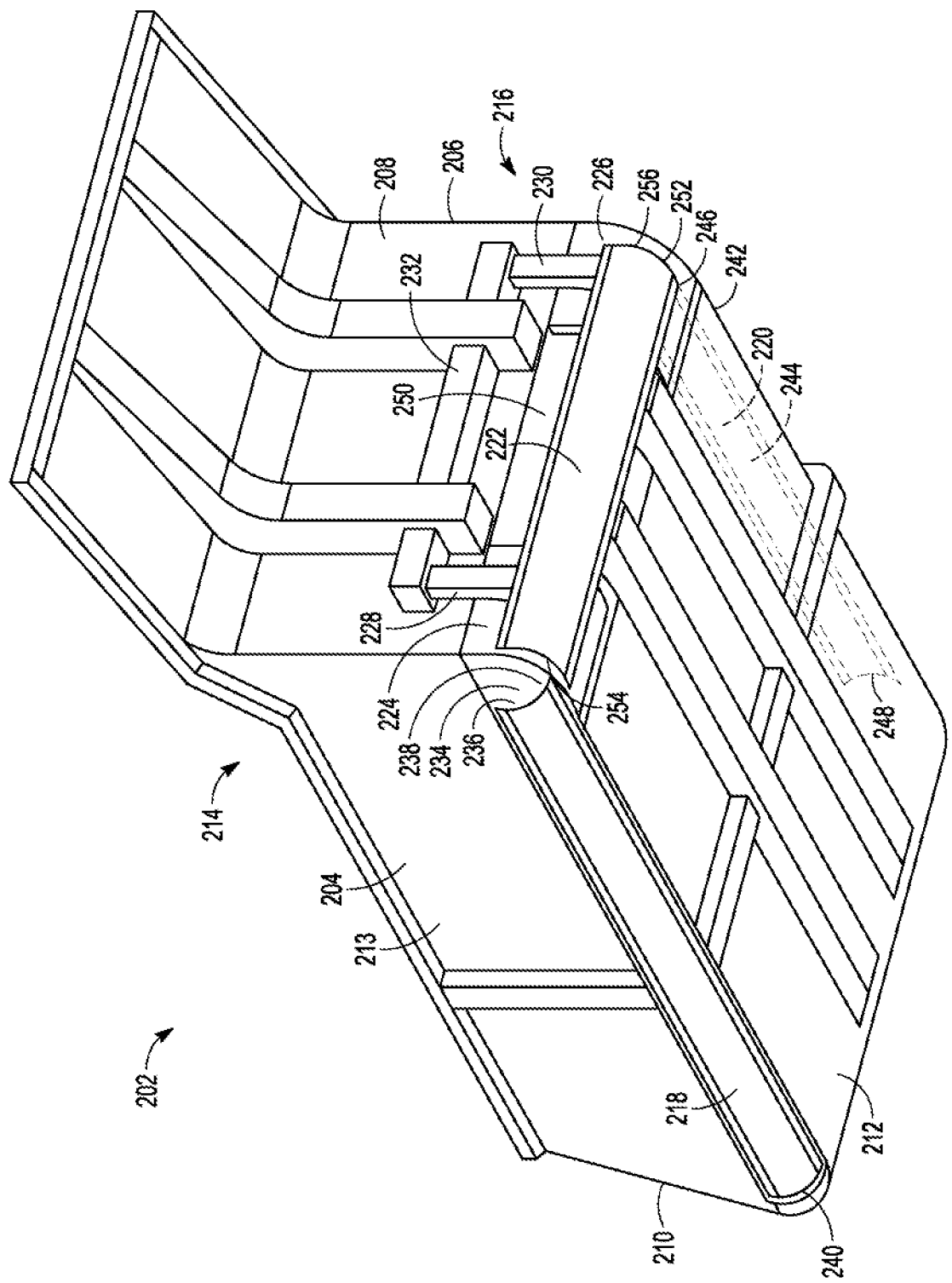
FIG. 2 shows a side perspective view of an exemplary truck body with a heat transfer system.

FIG. 2 illustrates an example truck body 202 of an industrial truck. Only the truck body 202 is illustrated for description purposes and in one example the truck body 202 is truck body 18 of FIG. 1. The truck body 202 includes a first side wall 204, second side wall 206, front wall 208, body rear/tail 210, and body floor 212 that form an exterior 213 that surrounds an interior 214 that receives material loads for hauling.

A heat transfer system 216 is coupled to the truck body 202 to transfer heat along exterior 213 of the truck body 202 and includes numerous components. In one example, the heat transfer system 216 includes a first sidewall attachment 218, second sidewall attachment 220, front wall attachment 222, first front wall plate 224, second front wall plate 226, first front wall vertical conduit 228, second front wall vertical conduit 230, and front wall horizontal conduit 232.

The first sidewall attachment 218 in one example as illustrated is generally arcuate having a generally C-shaped body. The first sidewall attachment 218 couples to the first sidewall 204 and curves around the transition 234 between the first sidewall 204 and body floor 212 to couple to the exterior 213 of the body floor 212. In this manner a first sidewall channel 236 is formed between the first sidewall attachment 218 and the truck body 202. This first sidewall channel 236 extends from a first open end 238 adjacent the front wall 208 and terminates at a second open end 240 adjacent to the body rear/tail 210 that in one example functions as an exhaust inlet. In particular, heat is transferred from the truck body 202 and environment, including from the sun or exhaust, through the first sidewall attachment 218 and first sidewall channel 236 to heat the transition 234, first sidewall 204 and body floor 212. Thus, any materials in the interior 214 of the truck body 202 at this transition 234 or along its path from exhaust inlet that contains moisture, or is frozen to the truck body, resulting in the material sticking to the truck body 202 is heated, evaporating the moisture to reduce carryback materials from forming. Even when the amount of moisture within the material is limited, the increased heat causes bonds formed within the material and between the material and truck body 202 to break to assist in dislodging material from the truck body. Thus, the amount of carryback materials is minimized.

The second sidewall attachment 220, in one example as illustrated is generally arcuate having a generally C-shaped body. The second sidewall attachment 220 couples to the second sidewall 206 and curves around the transition 242 between the second sidewall 206 and body floor 212 to couple to the exterior 213 of the body floor 212. In this manner a second sidewall channel 244 is formed between the second sidewall attachment 220 and the truck body 202. This second sidewall channel 244 extends from a first open end 246 adjacent the front wall 208 and terminates at a second open end 248 adjacent to the body rear/tail 210 that in one example functions as an exhaust inlet. In particular, heat is transferred from the truck body 202 and environment, including from the sun or exhaust, through the second sidewall attachment 220 and second sidewall channel 244 to heat the transition 242 and second sidewall 206. Thus, any materials in the interior 214 of the truck body 202 at this transition 242 or along its path from exhaust inlet that contains moisture, or is frozen to the truck body 202, resulting in the material sticking to the truck body 202 is heated, evaporating the moisture and reducing carryback materials from forming. Even when the amount of moisture within the material is limited, the increased heat causes bonds formed within the material and between the material and truck body 202 to break these bonds to assist in dislodging material from the truck body. Thus, the amount of carryback materials is minimized.

Front wall attachment 222, in one example as illustrated is generally arcuate having a generally C-shaped body. The front wall attachment 222 couples to the front wall 208 and curves around the transition 250 between the front wall 208 and body floor 212 to couple to the exterior 213 of the body floor 212. In this manner, a front wall channel 252 is formed between the front wall attachment 222 and the truck body 202. This front wall channel 252 extends from a first open end 254 adjacent the first sidewall 204 and terminates at a second open end 256 adjacent the second sidewall 206. In particular, heat is transferred from the truck body 202 and environment, including from the sun or exhaust, through the front wall attachment 222 and front wall channel 252 to heat the transition 250 and front wall 208. Thus, any materials in the interior 214 of the truck body 202 at this transition 250 that contains moisture, or is frozen to the truck body 202, resulting in the material sticking to the truck body 202 is heated, evaporating the moisture and reducing carryback materials from forming. Even when the amount of moisture within the material is limited, the increased heat causes bonds formed within the material and between the material and truck body 202 to break these bonds to assist in dislodging material from the truck body. Thus, the amount of carryback materials is minimized.

In addition to front wall attachment 222, the front wall 208 in one example includes first front wall plate 224, second front wall plate 226, first front wall vertical conduit 228, second front wall vertical conduit 230, and front wall horizontal conduit 232. The first front wall plate 224 and second front wall plate 226 both couple to and extend arcuately from the front wall 208 to couple to the body floor 212. In the example of FIG. 2 the first and second wall plates 224 and 226 couple to the front wall attachment 222. The first and second front wall vertical conduits 228, 230 meanwhile each couple respectfully to the first and second wall plates 224, 226 and extend vertically along the front wall 208. In one example the first and second vertical conduits 228, 230 couple to the horizontal conduit 232 to provide communication between the first and second vertical conduits 228, 230 and horizontal conduit 232 such that air transferring heat received from any of the first and second vertical conduits 228, 230 and horizontal conduit 232 is transferred to the front wall attachment 222, first front wall plate 224, and/or second front wall plate 226. Thus, any materials in the interior 214 of the truck body 202 at transition 250 or along the front wall 208 that contains moisture, or is frozen to the truck body 202, resulting in the material sticking to the truck body 202 is heated, evaporating the moisture and reducing the likelihood of carryback materials from forming. Even when the amount of moisture within the material is limited, the increased heat causes bonds formed within the material and between the material and truck body 202 to break these bonds to assist in dislodging material from the truck body. Thus, the amount of carryback materials is minimized.

While in the example of FIG. 2 all components of the heat transfer system 216 couple to and secure to the exterior 213 of the truck body, in other examples the heat transfer system 216 includes components that only couple to and secure to the interior 214 of the truck body. Alternatively, the heat transfer system 216 can have some components on the exterior 213 of the truck body 202 while other components are within the interior 214 of the truck body.

Figure 3:
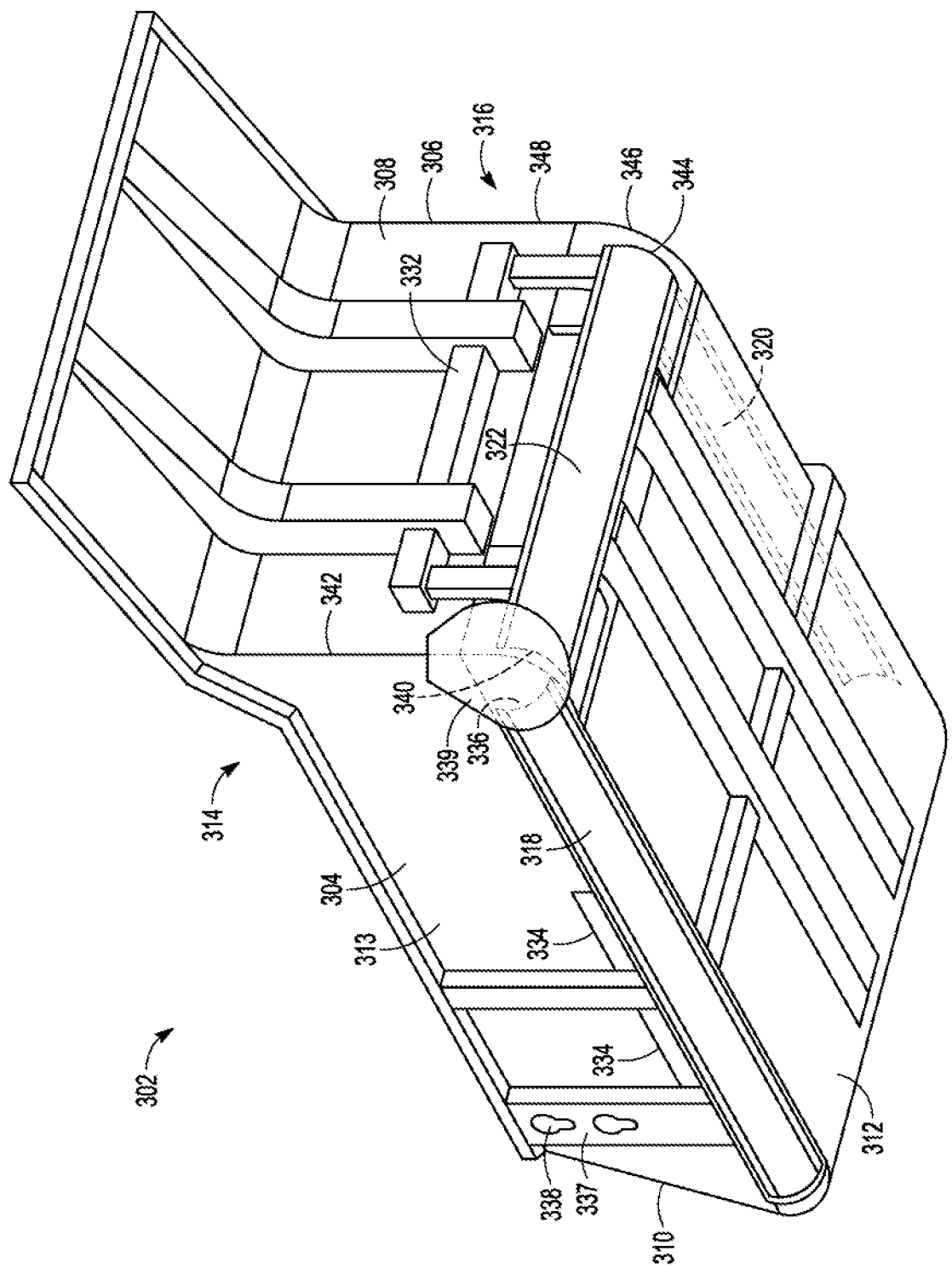
FIG. 3 shows a side perspective view of an exemplary truck body with a heat transfer system.

FIG. 3 illustrates another example truck body 302 of an industrial truck. Only the truck body 302 is illustrated for description purposes and in one example the truck body 302 is truck body 18 of FIG. 1. In this example, the truck body 302 includes a first side wall 304, second side wall 306, front wall 308, body rear/tail 310, and body floor 312 that form an exterior 313 that surround an interior 314 that receives material loads for hauling.

A heat transfer system 316 is coupled to the truck body 302 to transfer heat along the exterior 313 of the truck body 302 and includes numerous components. The heat transfer system 316 includes a first sidewall attachment 318, second sidewall attachment 320, front wall attachment 322, and front wall horizontal conduit 332 coupled similarly in relation to one another as previously described in relation to FIG. 2; however, the first sidewall attachment 318 and second sidewall attachment 320 do not extend to the body rear/tail 310 and first and second front plates and first and second front wall vertical conduits are eliminated.

The heat transfer system 316 of FIG. 3 also includes sidewall plates 334 that are coupled to the first sidewall 304 at the sidewall transition 336 and are coupled to receive the first sidewall attachment 318. The heat transfer system 316 also includes a sidewall vertical vent conduit 337 in communication with the first sidewall attachment 318 and having openings 338 therein for venting heat. An elbow 339 couples the first sidewall attachment 318 and front wall attachment 322 providing a communication pathway between the first sidewall attachment 318 and an opening 340 of the front wall attachment 322. The elbow 339 transfers heat along the front wall 308 adjacent to a transition 342 between the first sidewall 304 and front wall 308. A second front wall opening 344 similarly communicates with an opening 346 of the second sidewall attachment 320 to provides a communication pathway between the second sidewall attachment 320 and front wall attachment 322. Again, the openings 344, 346 allow the conveyance or transfer of heat along the transition 348 between second sidewall 306 and front wall 308.

While in the example of FIG. 3 all components of the heat transfer system 316 couple to and secure to the exterior 313 of the truck body, in other examples the heat transfer system 316 includes components that only couple to and secure to the interior 314 of the truck body. Alternatively, the heat transfer system 316 can have some components on the exterior 313 of the truck body 302 while other components are within the interior 314 of the truck body.

Figure 4:
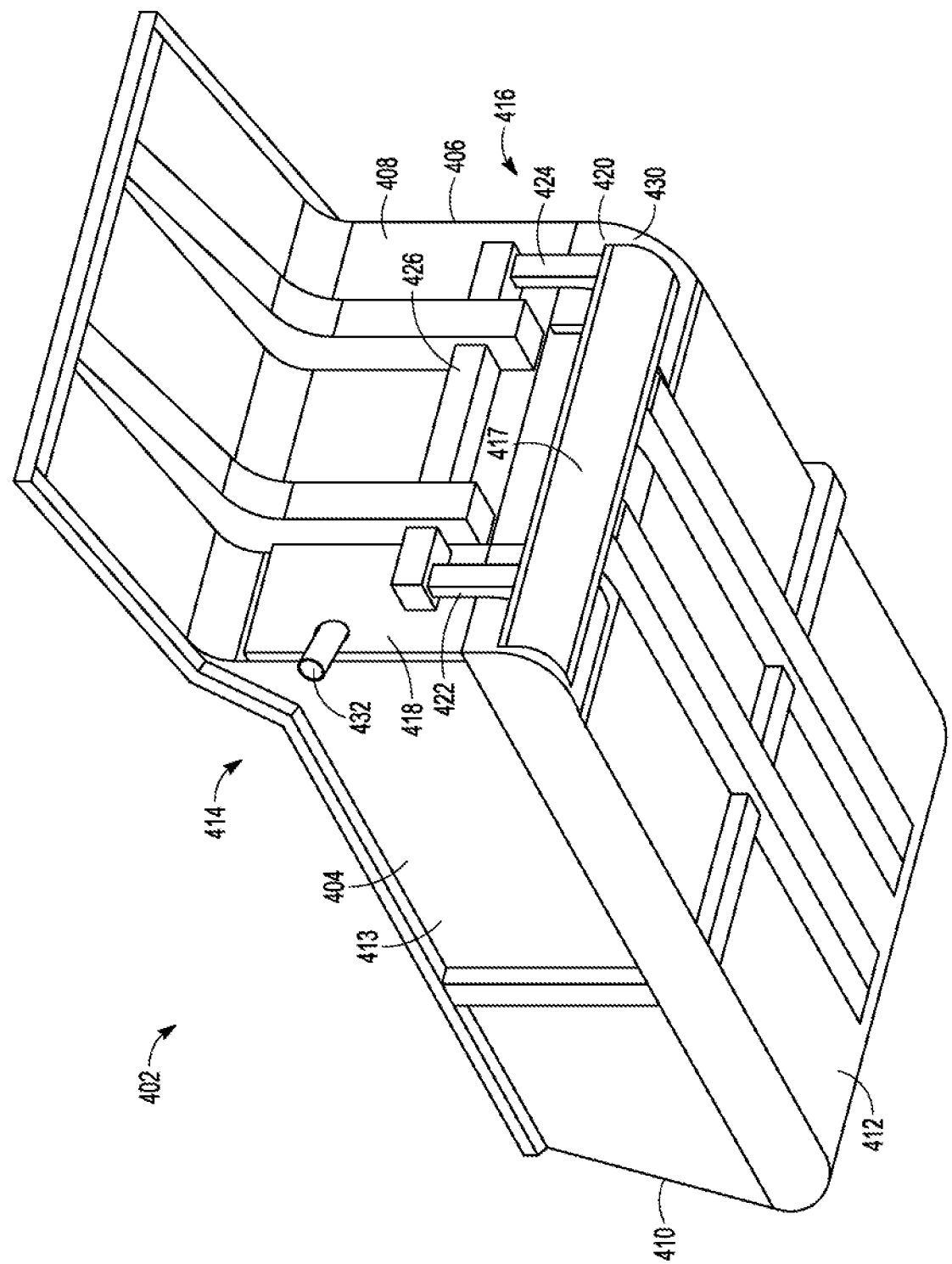
FIG. 4 shows a side perspective view of an exemplary truck body with a heat transfer system.

FIG. 4 illustrates yet another example truck body 402 of an industrial truck. Only the truck body 402 is illustrated for description purposes and in one example the truck body 402 is truck body 18 of FIG. 1. In this example, the truck body 402 includes a first side wall 404, second side wall 406, front wall 408, body rear/tail 410, and body floor 412 that form an exterior 413 that surround an interior 414 that receives material loads for hauling.

A heat transfer system 416 is coupled to the truck body 402 to transfer heat along the exterior 413 of the truck body 402 and includes numerous components. In this example, the heat transfer system 416 is only coupled to the front wall 408. Sidewall attachments and structures are eliminated for this example. The heat transfer system 416 instead includes a front wall attachment 417, first front wall plate 418, a second front wall plate 420, first front wall vertical conduit 422, second front wall vertical conduit 424, and a horizontal conduit 426. The first front wall plate 418 extends from the body floor 412, arcuately around a transition 430 between the body floor 412 and front wall 408 and along the front wall 408 terminating adjacent the top of the front wall 408. The first wall plate includes a vent opening 432 and is coupled to the front wall attachment 417, first vertical conduit 422, and the horizontal conduit 426.

The second front wall plate 420 meanwhile, extends from the body floor 412, arcuately around the transition 430 to the front wall 408. The second front wall plate 420 does not extend along the front wall 408 to adjacent the top of the front wall 408 and instead terminates adjacent the bottom of the front wall 408 and is thus a different height than the first front wall plate 420. Consequently, the second front wall plate 420 only couples to the second front wall vertical conduit 424 and the front wall attachment 417. Still, heat is transferred through each component, providing a heat transfer pathway on the front wall 408.

While in the example of FIG. 4 all components of the heat transfer system 416 couple to and secure to the exterior 413 of the truck body, in other examples the heat transfer system 416 includes components that only couple to and secure to the interior 414 of the truck body. Alternatively, the heat transfer system 416 can have some components on the exterior 413 of the truck body 402 while other components are within the interior 414 of the truck body.

Figure 5:
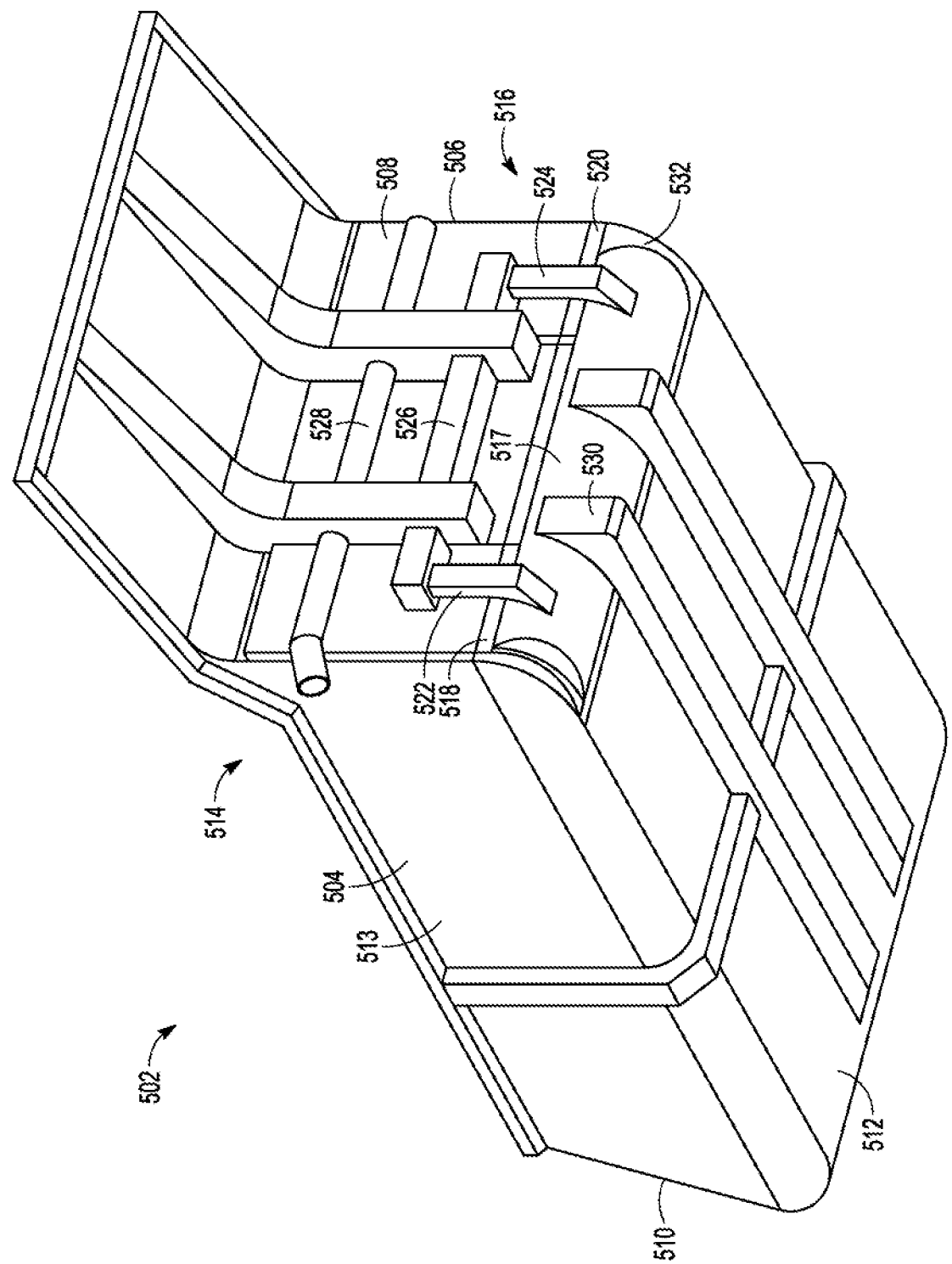
FIG. 5 shows a side perspective view of an exemplary truck body with a heat transfer system.

FIG. 5 illustrates yet another example truck body 502 of an industrial truck. Only the truck body 502 is illustrated for description purposes and in one example the truck body 502 is truck body 18 of FIG. 1. In this example, the truck body 502 includes a first side wall 504, second side wall 506, front wall 508, body rail/tail 510, and body floor 512 that form an exterior 513 that surround an interior 514 that receives material loads for hauling.

A heat transfer system 516 is coupled to the truck body 502 to transfer heat along the exterior 513 of the truck body 502 and includes numerous components. In this example, the heat transfer system 516 is only coupled to the front wall 508. Similar to the example of FIG. 4, sidewall attachments and structures are eliminated for this example. The heat transfer system 516 instead includes a front wall attachment 517, first front wall plate 518, a second front wall plate 520, first front wall vertical conduit 522, second front wall vertical conduit 524, a horizontal conduit 526, and a horizontal vent conduit 528.

In this example, the front wall attachment 517 is between structural support 530 of the truck body 502 and the front wall 510 and body floor 512. Specifically, in this embodiment the front wall attachment 517 is a conduit that includes airpaths and communication with the first front wall vertical conduit 522 and second front wall vertical conduit 524 to provide air flow path between the front wall attachment 517 and horizontal conduit 526.

Also in this example, the first and second front wall plates 518, 520 extend from the body floor 512, arcuately around a transition 532 between the body floor 512 and front wall 508 and along the front wall 508 terminating adjacent to the top of the front wall 508. The first and second wall plates 518, 520 are coupled to the front wall attachment 517, first front wall vertical conduit 522, second front wall vertical conduit 524, the horizontal conduit 526, and the horizontal vent conduit 528. In this example, the horizontal vent conduit 528 transfers heat from one side to the other while evenly heating the front wall 508 across and finally, exiting through outlet from heat transfer system 516.

While in the example of FIG. 5 all components of the heat transfer system 516 couple to and secure to the exterior 513 of the truck body, in other examples the heat transfer system 516 includes components that only couple to and secure to the interior 514 of the truck body 502. Alternatively, the heat transfer system 516 can have some components on the exterior 513 of the truck body 502 while other components are within the interior 514 of the truck body.

Figure 6:
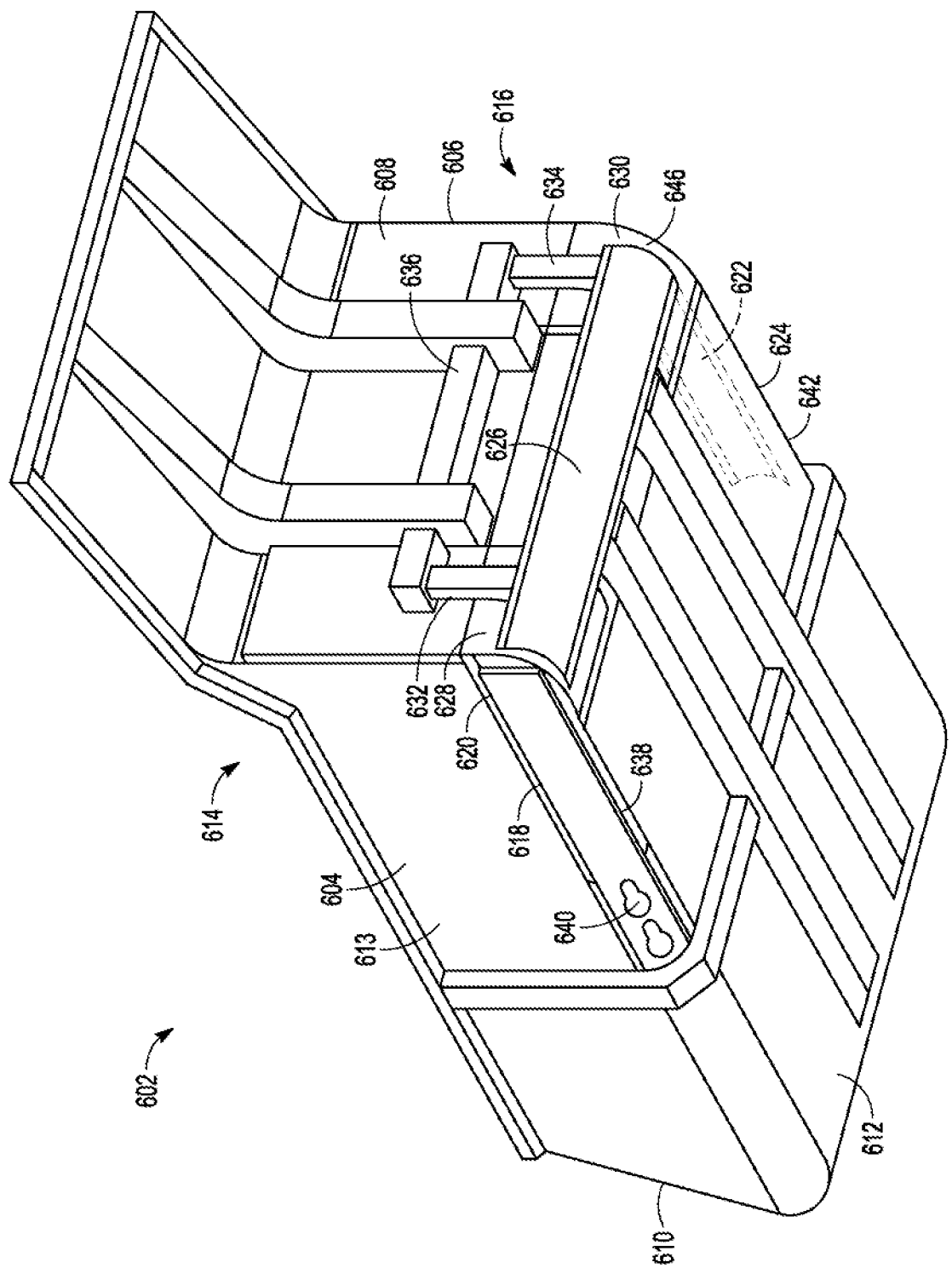
FIG. 6 shows a side perspective view of an exemplary truck body with a heat transfer system.

FIG. 6 illustrates yet another example truck body 602 of an industrial truck. Only the truck body 602 is illustrated for description purposes and in one example the truck body 602 is truck body 18 of FIG. 1. In this example, the truck body 602 includes a first side wall 604, second side wall 606, front wall 608, body rear/tail 610, and body floor 612 that form an exterior 613 that surround an interior 614 that receives material loads for hauling.

A heat transfer system 616 is coupled to the truck body 602 to transfer heat along the exterior 613 of the truck body 602 and includes numerous components. In this example, the heat transfer system 616 is coupled to the first sidewall 604, second sidewall 606, and front wall 608. The heat transfer system 616 instead includes a first sidewall attachment 618, a first sidewall plate 620, a second sidewall attachment 622, a second sidewall plate 624, a front wall attachment 626, a first front wall plate 628, a second front wall plate 630, a first front wall vertical conduit 632, a second front wall vertical conduit 634, and a front wall horizontal conduit 636.

The first sidewall attachment 618 in one example, as illustrated, is generally arcuate having a generally C-shaped body. The first sidewall attachment 618 couples to the first sidewall plate 620 that is coupled to or part of the first sidewall 604 and curves around a transition 638 between the first sidewall 604 and body floor 612 to couple to the exterior 613 of the 612. The first sidewall attachment 618 also includes vent openings 640 to allow venting of heated air or exhaust to avoid any buildup of exhaust air back pressure in the heat transfer system 616 and that in turn effects the performance of truck engine.

Similarly, the second sidewall attachment 622 in one example is generally arcuate having a generally C-shaped body. The second sidewall attachment 622 couples to the second sidewall plate 624 that is coupled to or part of the second sidewall 606 and curves around a transition 642 between the second sidewall 606 and body floor 612 to couple to the exterior 613 of the body floor 612. The second sidewall attachment 622 also includes vent openings to allow venting of heated air or exhaust to avoid any buildup of exhaust air back pressure in the heat transfer system 616 and that in turn effects the performance of truck engine.

Also in this example, the first and second front wall plates 628, 630 extend from the body floor 612, arcuately around a transition 646 between the body floor 612 and front wall 608 and along the front wall 608 terminating adjacent to the top of the front wall 608. The first and second wall plates 628, 630 are coupled to the front wall attachment 626, first front wall vertical conduit 632, second front wall vertical conduit 634, and the horizontal conduit 636.

While in the example of FIG. 6 all components of the heat transfer system 616 couple to and secure to the exterior 613 of the truck body 602, in other examples the heat transfer system 616 includes components that only couple to and secure to the interior 614 of the truck body. Alternatively, the heat transfer system 616 can have some components on the exterior 613 of the truck body 602 while other components are within the interior 614 of the truck body.

INDUSTRIAL APPLICABILITY

FIGS. 2-6 each show example heat transfer systems 32, 216, 316, 416, 516, 616 coupled to a truck body 202, 302, 402, 502, 602. Each heat transfer system 32, 216, 316, 416, 516, 616 illustrated transfers heat to, or adjacent to areas where accumulation of carryback materials is common. Such locations include, but are not limited to transitions 234, 242, 250, 336, 342, 348, 430, 532, 638, 642, 646 or joints between walls of the truck body 202, 302, 402, 502, 602 and the body floor. This includes wall to wall transitions, and wall to truck bed transitions. Additionally, each heat transfer system 32, 216, 316, 416, 516, 616 shows different heat transfer components for transferring heat. These include, but are not limited to conduits, plates, attachments, arcuate attachments, and the like that convey heat to desired areas of the truck body. Vent openings also can be provided to either direct heat along desired pathways or joints, or to prevent any buildup of exhaust air back pressure that in turn effects the performance of truck engine.

Such components may be located on a side wall, or only on the body floor, on the exterior of the truck body, on the interior of the truck body, coupled to the truck frame, coupled only to the truck body, or the like. The heat transfer system may be retrofitted to an existing truck body with detachable connections or may be manufactured as one piece with the truck body. For detachable examples, the components may be made separately to allow for easy replacement of components in case of damage to the components.

By placing the heat transfer systems 32, 216, 316, 416, 516, 616 adjacent areas where carryback occurs, heat is transferred from different locations on the truck body and directed toward these areas to heat the hauling material in those locations. Specifically, moisture causing adhesion and materials to stick or attach to the truck body, and specifically at these locations is minimized, if not eliminated. Even when moisture is not present, the heat still breaks adhesive type bonds, minimizing and eliminating carryback. Consequently, carryback in the truck body is reduced.

It will be apparent to those skilled in the art that various modifications and variations can be made to the disclosed heat transfer systems 32, 216, 316, 416, 516, 616 without departing from the scope of the disclosure. Other embodiments of the heat transfer systems 32, 216, 316, 416, 516, 616 will be apparent to those skilled in the art from consideration of the specification and practice of the methods disclosed herein. It is intended that the specification and examples be considered as exemplary only, with a true scope of the disclosure being indicated by the following claims and their equivalents.

What is claimed is:
1. A vehicle comprising:
a frame;
a truck body coupled to the frame and including a body floor, first sidewall, second sidewall, front wall, and body rear surrounding an interior;
a heat transfer system removably coupled to the truck body including an arcuate first attachment with a generally C-shaped body extending along and curving around a transition between at least two of the body floor, first sidewall, second sidewall, front wall, or body rear to convey heat to an interior surface of the truck body, wherein the heat transfer system is removably attached to an exterior of the truck body.

2. The vehicle of claim 1, wherein the attachment is an attachment secured to the first sidewall and body floor.

3. The vehicle of claim 1, wherein the heat transfer system further comprises a first plate that engages the front wall and:
   a second plate secured to the front wall spaced from the first plate; and
   the first attachment is secured to the front wall and extends between the first plate and second plate.

4. The vehicle of claim 3, wherein the heat transfer system further comprises:
   a conduit coupled to and extending between the first plate and second plate.

5. The vehicle of claim 3, wherein the heat transfer system further comprises:
   a first vertical conduit secured to the first plate; and
   a second vertical conduit secured to the second plate.

6. The vehicle of claim 3, wherein the heat transfer system further comprises:
   a second attachment secured to the first sidewall and communicating with the first attachment secured to the front wall to receive heat transfer from the first attachment.

7. The vehicle of claim 1, wherein the attachment is a first attachment that is secured to the first sidewall.

8. The vehicle of claim 7, wherein the heat transfer system further comprises:
   a second attachment that is secured to the second sidewall.

9. The vehicle of claim 7, wherein the heat transfer system further comprises:
   a conduit coupled to and extending in a transverse plane from the first attachment to transfer heat from the first attachment to within the conduit.

10. The vehicle of claim 9, wherein the conduit includes a vent opening.

11. A vehicle comprising:
    a frame;
    a truck body coupled to the frame comprising:
    a body floor;
    a first sidewall, second sidewall, front wall, and body rear secured to the body floor to form an open interior for receiving materials;
    a heat transfer system comprising:
    a first arcuate attachment with a generally C-shaped body removably attached to an exterior of the truck body and curving around a transition between the first sidewall and the body floor to transfer heat to the transition between the first sidewall and the body floor;
    a second arcuate attachment with C-shaped body removably attached to the exterior of the truck body and curving around a transition between the second sidewall and the body floor to transfer heat to the transition between the second sidewall and the body floor.

12. The vehicle of claim 11, the heat transfer system further comprising:
    a third attachment coupled between the front wall and the body floor to convey heat to a transition between the front wall and the body floor.

13. The vehicle of claim 12, wherein a conduit is coupled to the front wall of the truck body in spaced relation to the third attachment.

14. The vehicle of claim 11, wherein at least one of the first attachment or second attachment is removably secured to an exterior of the truck body.

15. The vehicle of claim 11, wherein the first attachment extends along the first sidewall from the front wall to the body rear.

16. The vehicle of claim 1, wherein the heat transfer system is only coupled to the front wall and the accurate attachment only curves around the body floor and the front wall.

* * * * *